Sept. 22, 1925.
N. K. SMITH
1,554,303
SAFETY ELEVATING HOOK
Filed Nov. 20, 1924
3 Sheets-Sheet 2
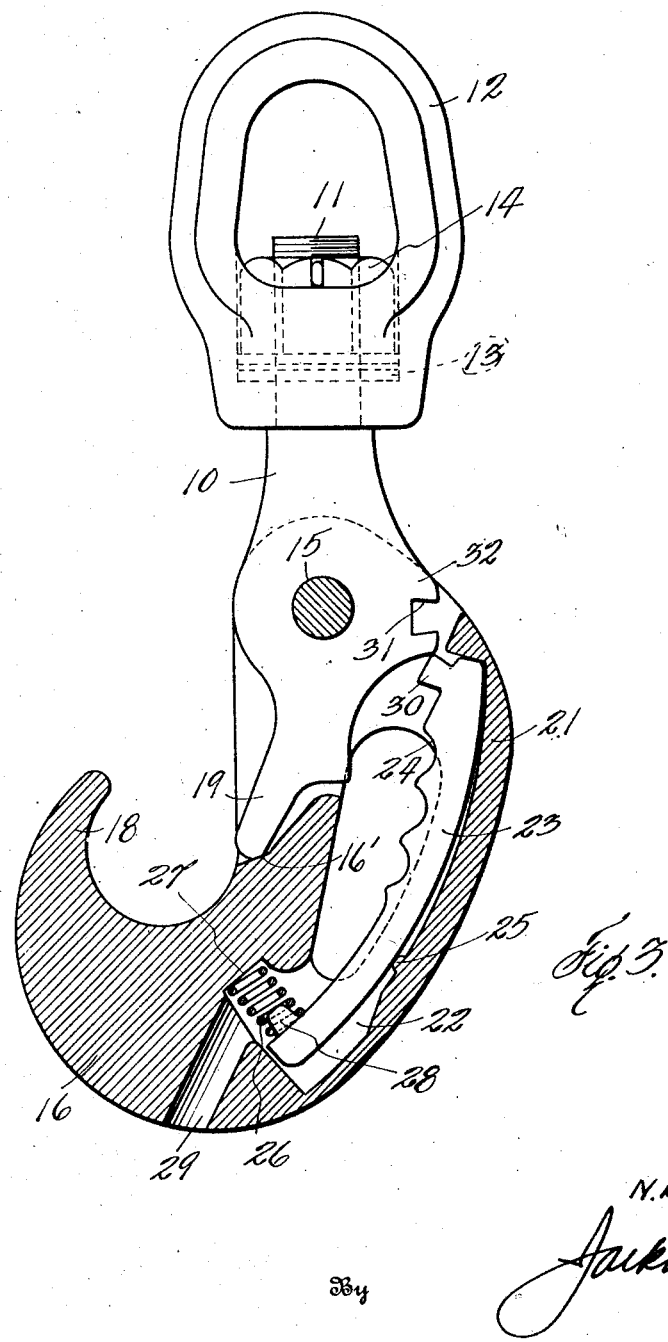

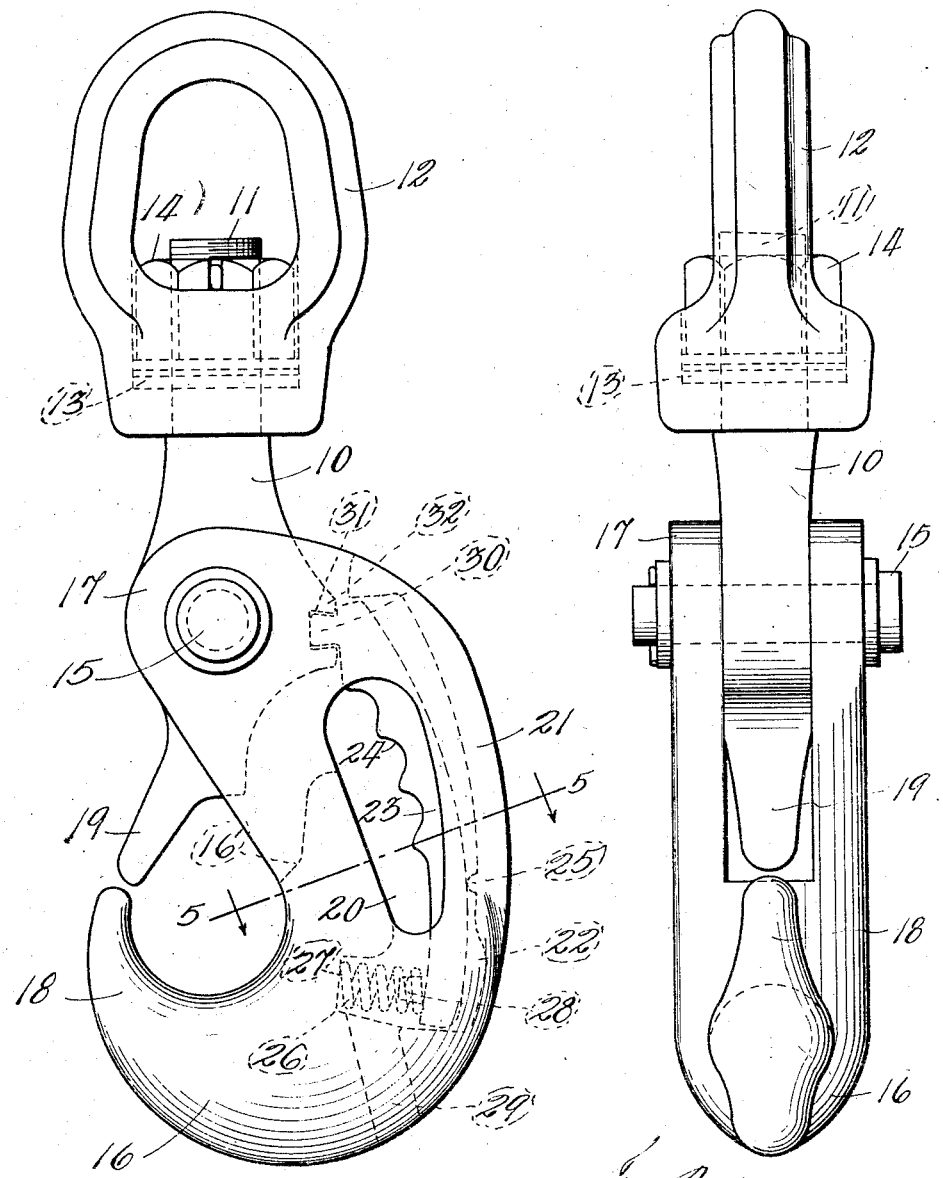

Sept. 22, 1925.   1,554,303
N. K. SMITH
SAFETY ELEVATING HOOK
Filed Nov. 20, 1924   3 Sheets-Sheet 3
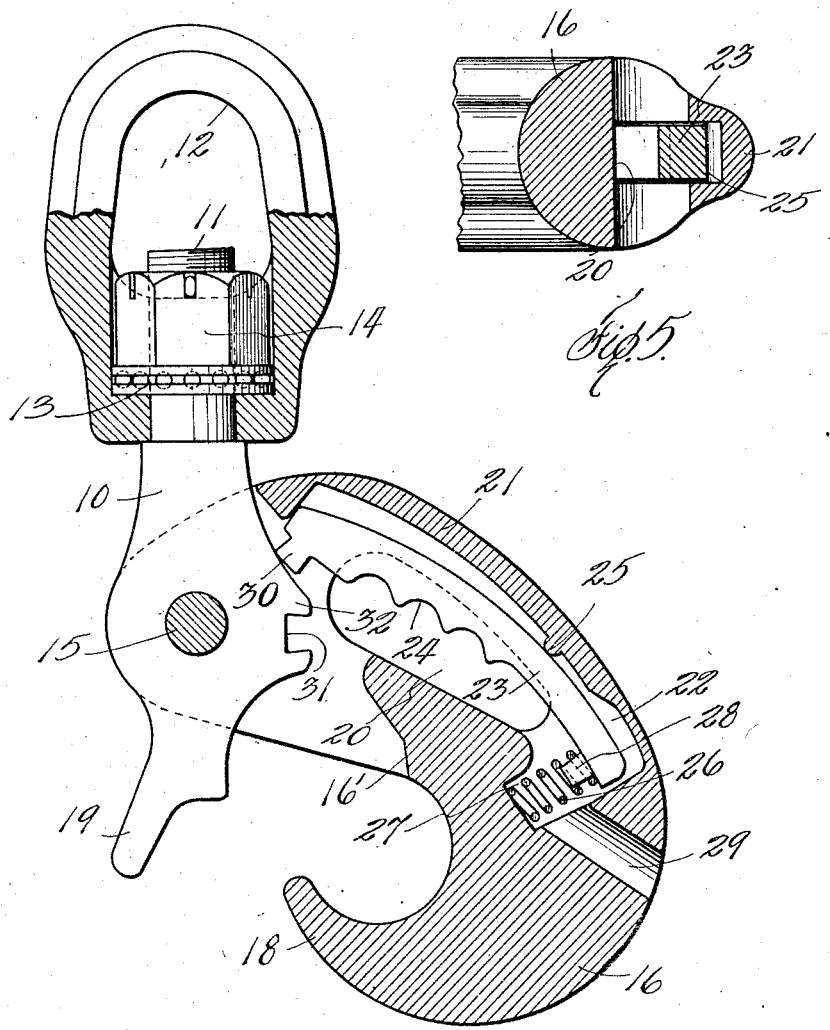

Patented Sept. 22, 1925.

1,554,303

UNITED STATES PATENT OFFICE.

NELSON K. SMITH, OF DALLAS, TEXAS.

SAFETY ELEVATING HOOK.

Application filed November 20, 1924. Serial No. 750,987.

*To all whom it may concern:*

Be it known that I, NELSON K. SMITH, citizen of the United States of America, residing at Dallas, in the county of Dallas and State of Texas, have invented certain new and useful Improvements in Safety Elevating Hooks, of which the following is a specification.

This invention relates to new and useful improvements in safety elevating hooks.

The object of the invention is to provide a safety hook for handling well tubing, sucker rods and any other member or device it is desired to raise and lower.

A particular object of the invention is to provide a bill or hook member pivotally supported off center so as to swing to an open position when released and unloaded.

A further object is to provide a latch for holding the hook member in a closed position, whereby upon the release of said latch the said member automatically swings to an open position, when unloaded.

Another object is to provide a hook member which will remain open until loaded and upon being loaded will swing to a closed position and latch itself.

An important object of the invention is to provide a safety hand hold for grasping the hook member and manipulating the latch without exposure to the work engaged.

A still further object is to provide a hook member which may be manually swung to a full open position to be engaged with the work, upon which it will be swung to a closed position by the work and latched.

Another object is to provide a novel form of latch of a highly effective nature.

A construction designed to carry out the invention will be hereinafter described, together with other features of the invention.

The invention will be more readily understood from a reading of the following specification and by reference to the accompanying drawings, in which an example of the invention is shown, and wherein:

Fig. 1 is a side elevation of a safety hook constructed in accordance with my invention and in its closed position, Fig. 2 is a front elevation of the same, Fig. 3 is a vertical sectional view showing the hook in one of its open positions, Fig. 4 is a vertical sectional view showing the hook in its other open position, and Fig. 5 is a cross-sectional view on the line 5—5 of Fig. 1.

In the drawings the numeral 10 designates an elongated flat shank having a cylindrical stud 11 at its upper end. The stud is swivelled in the lower end of a loop 12 which is recessed to receive ball bearing members 13. A nut 14 screwed on the upper end of the stud rests upon the members 13, the shank thus being supported to rotate freely in the loop. The loop and shank swivel connection is subject to variation and any suitable form of loop and connection may be employed.

The shank has its central portion enlarged and penetrated by a pin 15. A hook body member 16 has ears 17 at its upper end straddling the shank and pivoted on the pin. The body 16 is thus received at its upper portion. The major portion of the body 16 is offset laterally from the pivot, but the bill 18 underlies the pivot. The shank has a depending outwardly inclined closure finger 19 integral therewith. The hook body is normally held in a closed position so that the lower end or tip of the finger is adjacent the free end of the bill of the hook. Thus an eye or other connection engaged in the hook will be retained against displacement therefrom.

The hook body has an elongated opening 20 contiguous to its back edge, that portion of body lying between the opening and the back edge constituting a hand hold 21. The hook is recessed at 22 to receive a latch lever 23 confined within said recess and having a finger grip 24 exposed in the opening 20. Adjacent the lower end of recess the lever is fulcrumed on a boss 25 on the back wall of said recess. A coiled spring 26, seated in a pocket 27 extending forwardly from the recess, engages over a lug 28 on the lower front side of the lever below the fulcrum boss. A drain hole 29 leads from the pocket and is large enough to insert the spring in assembling the hook.

At its upper end the latch lever has a forwardly directed keeper 30 which is dovetailed to engage in a dovetailed notch 31 in a boss 32 in the edge of the shank opposite the pin 15. The tendency of the spring is to force the keeper into the notch. The lever being free to move vertically on the boss 25 is readily disengaged from the notch when compressed, but cannot be easily displaced by the hook.

By observing Fig. 3 it will be seen that when the latch lever 23 is depressed, so as to withdraw the keeper 30 from the notch 31, the hook body 16 being pivoted off center, will swing to the position shown. The body 16 has a shoulder 16' between the ears 17 and this engages the lower end of the finger 19 which is received in the recess between said ears. The keeper latch 30 engages under the boss 32 and by frictional contact holds the body 16 in its open position. It will be seen that when the hook body is swung to its open position (Fig. 3) the finger 19 is wholly housed in the recess between the ears 17 and a free and unobstructed entrance to the hook is provided.

When the links of an elevator or other connection is engaged in the bill 18 of the hook body, said body will be immediately swung, by the load, to a closed position as is shown in Fig. 1. The workman thus has only to engage the work in the bill and the hook then becomes self latching. When it is desired to disengage the hook from the work the latch lever 23 is depressed and the hook member 16 is swung upward to the position shown in Fig. 4. In all handling of the hook body the hand hold 21 is grasped and the knuckles are confined within the opening 20, which makes for safety.

Various changes in the size and shape of the different parts, as well as modifications and alterations, may be made within the scope of the appended claims.

What I claim, is:

1. In a safety hook, a support, a hook shank carried by the support, a hook body pivoted to the shank, and a self-acting latch carried by the body and engaging the shank.

2. In a safety hook, a support, a shank suspended from the support, a closure finger depending from the shank, and a hook body having a bill, the body being pivoted to the shank above the finger and free to swing, whereby its bill may be swung to each side of the finger and also may be registered therewith.

3. In a safety hook, a support, a shank suspended from the support, a closure finger depending from the shank, a hook body having a bill, the body being pivoted to the shank above the finger and free to swing, whereby its bill may be swung to each side of the finger and also may be registered therewith, and a latch for fastening the hook with its bill in juxtaposition to the finger.

4. In a safety hook, a support, a shank suspended from the support, a closure finger depending from the shank, a hook body having a bill and being pivoted to the shank above the finger and being free to swing, whereby its bill may be swung to each side of the finger and also may be registered therewith, the hook body having a hand opening therein, and a latch contained within the hook body, and exposed for operation in said body.

5. In a safety hook, a support, a shank carried by the support, a hook body pivoted on the shank, and a latch for holding the hook body in a closed position, said latch also holding the body in an open position.

6. In a safety hook, a supporting loop, a shank swivelled in the loop, a hook body pivoted on the shank, and a latch for fastening the hook body in an unbalanced position.

7. In a safety hook, a supporting loop, a shank swivelled in the loop, a closure element carried by the shank, a hook body pivoted on the shank and co-acting with the closure element, and a latch for fastening the hook body against swinging.

8. In a safety hook, a supporting loop, a shank swivelled in the loop, a closure element carried by the shank, a hook body pivoted on the shank and co-acting with the closure element, and a latch for holding the hook body in adjusted positions to which said body is swung.

9. In a safety hook, a support, a shank pendant from the support, a closure element carried by the shank, and a normally restrained hook body pivoted to the shank and co-acting with the closure element to normally close the hook, said hook body swinging to an open position when released and unloaded.

10. In a safety hook, a support, a shank pendant from the support, a hook member pivoted on the shank, a closure finger extending from the shank and co-acting with the free end of the hook member, and a latch for fastening the hook member with its free end in juxta-position to the closure finger.

11. In a safety hook, a support, a shank pendant from the support, a hook body pivoted on the shank, a closure finger extending from the shank above the finger and having an opening for receiving said finger when the hook body is swung to open the hook, and a latch for fastening the hook body in position.

12. In a safety hook, a support, a shank pendant from the support, a closure element carried by the shank, a hook body pivoted on the shank and co-acting with the closure element, and a latch carried by the hook body and engaging with the shank.

13. In a safety hook, a support, a shank suspended from the support, and a hook body pivoted on the shank and having a safety hand hold offset from the bill of the hook.

14. In a safety hook, a support, a shank suspended from the support, a hook body pivoted on the shank and having a safety hand hold offset from the bill of the hook, and a latch for fastening the hook body in position located at the hand hold.

15. In a safety hook, a supporting loop, a pendant shank swivelled to the loop, a hook body pivoted at its upper end to the shank, and a spring pressed latch carried by the hook body and engaging the shank.

16. In a safety hook, a supporting loop, a pendant shank swivelled to the loop, a closure finger extending from the shank, a hook body pivoted at its upper end to the shank and co-acting with the finger, a hand hold on the body, and a spring pressed latch carried by the hook body adjacent the hand hold.

17. In a safety hook, a supporting loop, a pendant shank swivelled to the loop, a closure finger integral with the shank, a hook body pivoted at its upper end to the shank above the finger and recessed to receive the finger when swung, said body having an offset hand opening, and a latch housed in the body for engaging the shank, said latch being exposed in the hand opening of the hook member.

18. In a safety hook, a supporting loop, a pendant shank having its upper end swivelled in the loop and provided with a keeper notch at one side, a rigid closure finger extending from the shank, a hook body pivoted at its upper end to the shank above the finger, the free end of the hook body co-acting with the finger, said body having a hand opening and being recessed to receive the finger when swung, and a latch fulcrumed in the hook body and having a keeper engaging in the keeper notch of the shank, said latch being exposed at the hand hold of the hook body.

19. In a safety hook, a loop support, a shank swivelled in the loop, a hook body pivoted on the shank, a latch lever mounted in the hook body and engaging the shank, a fulcrum boss in the body on which the lever is fulcrumed and is free to slide vertically, and a coiled spring engaging the lever.

In testimony whereof I affix my signature.

NELSON K. SMITH.